Nov. 26, 1957     A. C. AUER     2,814,500

STEERING LINKAGE FOR VEHICLES

Filed Sept. 26, 1955

INVENTOR

Adolf Christian Auer

BY Bailey, Stephens & Huettig

ATTORNEYS

United States Patent Office 2,814,500
Patented Nov. 26, 1957

2,814,500

STEERING LINKAGE FOR VEHICLES

Adolf Christian Auer, Nurnberg, Germany, assignor to Maschinenfabrik Augsburg-Nürnberg, A. G., Nurnberg, Germany Application September 26, 1955, Serial No. 536,598

Claims priority, application Germany September 30, 1954

4 Claims. (Cl. 280—93)

This invention relates to a steering linkage for vehicles. In particular, the invention is directed to a steering linkage for knee-action, spring-suspended, steering wheels.

The front wheels or the axles of vehicles are independently and individually suspended in order to prevent the front wheels from wobbling or shimmying. Such suspension is very desirable in order to obtain a large spring action for truck steering wheels. By simple means a geometrically correct steering linkage can be constructed for steering wheels having steering arms arranged transversely of the vehicle, but a different case exists for steering wheels having steering arms arranged longitudinally of the vehicle, and steering wheels journaled on guide shafts. Generally, since no other possibility has heretofore existed, the steering arms of wheels journaled on guide shafts are connected together by means of a tie rod as commonly used in vehicles having a rigid front axle. If one of the wheels moves up or down, the other wheel will be tilted since it is locked to the moved wheel by a tie rod forming a rigid connection therebetween. This kind of a steering lock can not be tolerated for heavy trucks having high air pressure tires. Furthermore, such a steering lock is liable to make the vehicle swerve. The objects of the instant invention are to produce a steering linkage for wheels individually suspended and slidably mounted on shafts having longitudinally extending steering arms, so that the wheel may move vertically without being locked to another wheel, and further to produce a construction in which the steering linkage of one wheel is independent of the length of the steering arm in so far as its construction is concerned.

When the steering wheels are actuated by longitudinally extended steering arms, a geometrically correct steering linkage construction is obtained by using a divided tie rod, wherein the distance between the ball and socket joints between the tie rod and steering arm adjacent the wheel, and similar joints on the opposite end of the tie rod, when projected into the plane of oscillation of the steered wheels, is equal to the projection of the steering arms into the same plane. This arrangement has the possible disadvantage that the bearing points formed by the ball and socket joints must be spaced with respect to the longitudinal axis of the vehicle by a distance equal to the length of the steering arms. As it is desirable to make the steering arms as long as possible in order to obtain a spring suspension movable as vertically as possible with the wheels, the tie rods ordinarily can not be efficiently arranged because of the lack of space in the direction of the longitudinal axis of the vehicle.

Inasmuch as the journaling of the wheels on a guide shaft amounts to a system with infinitely long guiding means, the above-described system can not be efficiently employed therewith.

In the instant invention the steering knuckle is slidably journaled on a vertical shaft. Steering arms extend longitudinally of the vehicle from opposite sides of the steering knuckle. The ends of these steering arms are pivotally connected by tie rods, respectively, and the other ends of the tie rods are pivotally connected to a corresponding pair of intermediate steering arms secured to a steering plate pivotally mounted upon a post fixed to the frame of the vehicle.

The objects of the invention are obtained by the structure more fully described with reference to the accompanying drawings, in which:

Figure 1a is a perspective view of a steering wheel having a parallelogram type of steering linkage.

Figure 2a is a plan view of Figure 1a.

Figure 4 is a cross-sectional view taken on the line 4—4 of Figure 2a.

Figure 1:
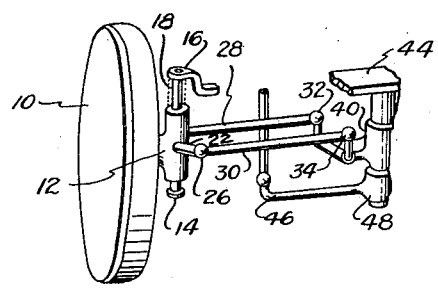
Figure 1 is a perspective view of a spring-suspended steering wheel and the steering linkage connected therewith.

In Figure 1 the steering wheel 10 is mounted upon a steering knuckle 12, which in turn is slidably journaled upon a vertical shaft or king pin 14. The upper end of shaft 14 is connected to the vehicle frame by member 16, and the spring suspension is obtained by means of a spring 18 interposed between the upper end of knuckle 12 and member 16.

Wheel steering arms 20 and 22 extend substantially longitudinally of the vehicle from opposite sides of steering knuckle 12. The ends of these steering arms are joined by ball and socket joints 24 and 26 respectively to parallel tie rods 28 and 30. The other ends of the tie rods are connecetd by ball and socket joints 32 and 34 to the free ends of a U-shaped intermediate steering arm 36 which is journaled in the bearing 38 of a steering plate 40 for rocking or swinging movement toward and from the adjacent wheel. This steering plate 40 is journaled upon a post 42 fixed to the frame 44 of the vehicle. A drag link 46 is connected to plate 40 by a spline joint 48.

Figure 2:
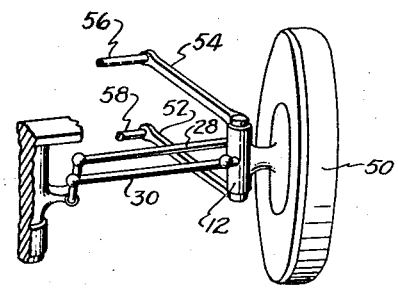
Figure 2 is a plan view of Figure 1.
Figure 2:
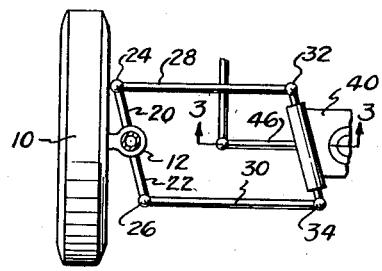
Figure 3:
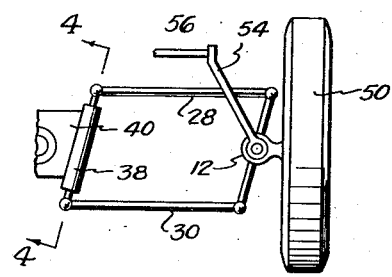
Figure 3 is a cross-sectional view taken on the line 3—3 in Figure 2.
Figure 3:
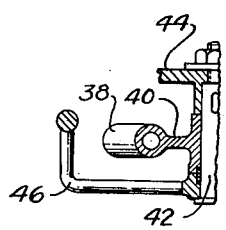
Figure 4:
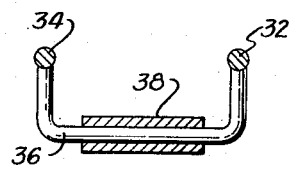

In operation, if wheel 10 moves upwardly, ball and socket joints 24 and 26 will move vertically, in the axis of shaft 14, and ball and socket joints 32 and 34 will move counter-clockwise of the position shown in Figures 1 and 2. Wheel 10 is therefore independently suspended and movable without interference in a vertical plane. When drag link 46 is actuated, plate 40 will be rotated upon post 42, and wheel 10 turned by movement transmitted through the pair of parallel tie rods 28 and 30. No connection or steering lock exists between wheel 10 and the wheel on the opposite side of the vehicle. It is apparent that the steering wheel opposite wheel 10 can be provided with a similar linkage, and that both wheels can be turned simultaneously by means of the tie rods connected to the steering plate 40, while still permitting the wheels to have independent vertical movement.

In Figures 1a and 2a it is shown that the same advantages can be obtained by steering wheels suspended on pairs of suspension arms pivotal in a vertical plane. The wheel 50 is journaled upon a steering knuckle 12 connected by tie rods 28 and 30 to steering plate 40, as in Figure 1. However, suspension arms 52 and 54 are connected to knuckle 12 and extend longitudinally of the vehicle in the same direction. The outer ends of these arms are journaled upon shafts 56 and 58 respectively, so that arms 52 and 54 will rotate in a vertical plane.

Having now described the means by which the objects of the invention are obtained, I claim:

1. A steering linkage for a vehicle having individually sprung wheels with each wheel having a steering knuckle, comprising means mounting said steering knuckle and wheel for vertical movement with respect to the vehicle, a fixed post between said wheels, a steering plate horizontally rotatable on said post, U-shaped intermediate steering arms pivotally secured, respectively, to opposite sides of said plate, pairs of tie rods, respectively, joined to the outer ends of said arms, and wheel steering arms attached to each knuckle parallel to said U-shaped arms and pivotally joined to said tie rods.

2. A steering linkage as in claim 1, said wheel steering arms further extending on opposite sides of said knuckles in the longitudinal direction of the vehicle.

3. A steering linkage as in claim 1, said mounting means for said steering knuckle and wheel further comprising a king pin secured to said wheel with said steering knuckle vertically slidable on said pin.

4. A steering linkage as in claim 1, said mounting means for said steering knuckle and wheel further comprising a pair of suspension arms having one of their ends joined to said knuckle, and pivotal mounting means for the opposite ends of said arms.

References Cited in the file of this patent
UNITED STATES PATENTS

| | | |
|---|---|---|
| 801,000 | Gambee | Oct. 3, 1905 |
| 923,210 | Strawn | June 1, 1909 |
| 2,713,497 | Bretschneider | July 19, 1955 |